United States Patent
Obayashi et al.

(10) Patent No.: US 11,037,265 B2
(45) Date of Patent: Jun. 15, 2021

(54) INFORMATION PROCESSING METHOD, INFORMATION PROCESSING APPARATUS, AND STORAGE MEDIUM

(71) Applicant: CANON KABUSHIKI KAISHA, Tokyo (JP)

(72) Inventors: Masaaki Obayashi, Kawasaki (JP); Hiroyasu Kunieda, Yokohama (JP); Masao Kato, Kawasaki (JP); Maya Kurokawa, Tokyo (JP); Yoshinori Mizoguchi, Tokyo (JP); Fumitaka Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 493 days.

(21) Appl. No.: 15/217,213

(22) Filed: Jul. 22, 2016

(65) Prior Publication Data

US 2017/0039670 A1 Feb. 9, 2017

(30) Foreign Application Priority Data

Aug. 7, 2015 (JP) .............................. JP2015-157511
Dec. 25, 2015 (JP) .............................. JP2015-255241

(51) Int. Cl.
  G06T 1/00 (2006.01)
  G06F 9/451 (2018.01)
  G06F 3/0481 (2013.01)

(52) U.S. Cl.
  CPC .......... G06T 1/0007 (2013.01); G06F 3/0481 (2013.01); G06F 9/451 (2018.02)

(58) Field of Classification Search
  CPC ...... G06F 9/451; G06F 3/0481; G06T 1/0007
  See application file for complete search history.

(56) References Cited

U.S. PATENT DOCUMENTS

| 6,771,801 B1 * | 8/2004 | Fisher ................ H04N 1/00164 283/67 |
| 7,515,294 B2 | 4/2009 | Yamazoe et al. |
| 8,438,163 B1 * | 5/2013 | Li ....................... G06F 17/3028 382/159 |

(Continued)

FOREIGN PATENT DOCUMENTS

| CN | 1622138 A | 6/2005 |
| CN | 101714212 A | 5/2010 |

(Continued)

OTHER PUBLICATIONS

Jan. 2, 2017 European Search Report in European Patent Appln. No. 16001640.8.

Primary Examiner — Sherrod L Keaton
(74) Attorney, Agent, or Firm — Venable LLP

(57) ABSTRACT

Images are divided into image groups based on time information indicating a time corresponding to each of the images. If the number of the image groups obtained in the dividing is smaller than a predetermined number, the number of the image groups is matched with the predetermined number by increasing the number of the image groups. If the number of the image groups obtained in the dividing is larger than the predetermined number, the number of the image groups is matched with the predetermined number by decreasing the number of the image groups. At least one image included in each of the image groups obtained in the matching is laid out in a template.

17 Claims, 14 Drawing Sheets

| SCENE ID | SCENE INFORMATION ||||| DELETION TARGET | SCENE INTEGRATION ID |
|---|---|---|---|---|---|---|---|
| | IMAGE COUNT | PERSON COUNT | DEGREE OF IMPORTANCE | PERIOD | TIME DIFFERENCE | | |
| 1 | 114 | 100 | 233 | 10hours:57minutes:54seconds | 7days:22hours:43minutes:54seconds | | 1 |
| 2 | 3 | 3 | 9 | 25seconds | 20hours:47minutes:21seconds | | 2 |
| 3 | 63 | 35 | 30 | 4hours:6minutes:20seconds | 10days:21hours:58minutes:36seconds | | 2 |
| 4 | 76 | 55 | 115 | 44minutes:38seconds | 12days:14hours:53minutes:26seconds | | 3 |
| 5 | 913 | 233 | 404 | 4days:7hours:22minutes:22seconds | 10days:18hours:33minutes:43seconds | | 4 |
| 6 | 13 | 13 | 26 | 3hours:1minute:27seconds | 15hours:12minutes:8seconds | | 5 |
| 7 | 15 | 10 | 23 | 2hours:10minutes:39seconds | 1day:10hours:55minutes:1second | | 6 |
| 8 | 3 | 3 | 4 | 14seconds | 20days:16hours:14minutes:44seconds | | 6 |
| 9 | 75 | 54 | 75 | 4hours:11minutes:11seconds | 19days:19hours:22minutes:39seconds | | 7 |
| 10 | 14 | 4 | 6 | 3hours:19minutes:5seconds | 2days:15hours:57minutes:21seconds | | 7 |
| 11 | 1 | 0 | 0 | 0seconds | 18days:4hours:2minutes:10seconds | * | — |
| 12 | 152 | 56 | 33 | 4hours:8minutes:15seconds | 5days:22hours:11minutes:48seconds | | 8 |
| 13 | 123 | 43 | 22 | 2hours:19minutes:58seconds | 20days:18hours:55minutes:15seconds | | 9 |
| 14 | 141 | 64 | 88 | 4hours:52minutes:13seconds | 0seconds | | 10 |

(56) References Cited

U.S. PATENT DOCUMENTS

| | | | |
|---|---|---|---|
| 8,582,897 B2 | 11/2013 | Sabe | |
| 9,509,859 B2 | 11/2016 | Momoki et al. | |
| 9,646,196 B2 | 5/2017 | Miyazaki et al. | |
| 2006/0221779 A1 | 10/2006 | Matsushita et al. | |
| 2008/0049976 A1* | 2/2008 | Isomura | G11B 27/034 |
| | | | 382/106 |
| 2009/0296142 A1 | 12/2009 | Tomihisa | |
| 2012/0236176 A1* | 9/2012 | Kita | H04N 1/32144 |
| | | | 348/231.2 |
| 2013/0004073 A1* | 1/2013 | Yamaji | H04N 1/00196 |
| | | | 382/173 |
| 2014/0078177 A1 | 3/2014 | Yamaji et al. | |
| 2015/0093034 A1* | 4/2015 | Momoki | G06F 16/583 |
| | | | 382/224 |
| 2015/0189107 A1* | 7/2015 | Murata | H04N 1/387 |
| | | | 345/629 |

FOREIGN PATENT DOCUMENTS

| | | |
|---|---|---|
| CN | 103678444 A | 3/2014 |
| CN | 104756157 A | 7/2015 |
| JP | 2004-246868 A | 9/2004 |
| JP | 2007-318461 A | 12/2007 |
| JP | 2014-075777 A | 4/2014 |
| JP | 2015-069426 A | 4/2015 |

* cited by examiner

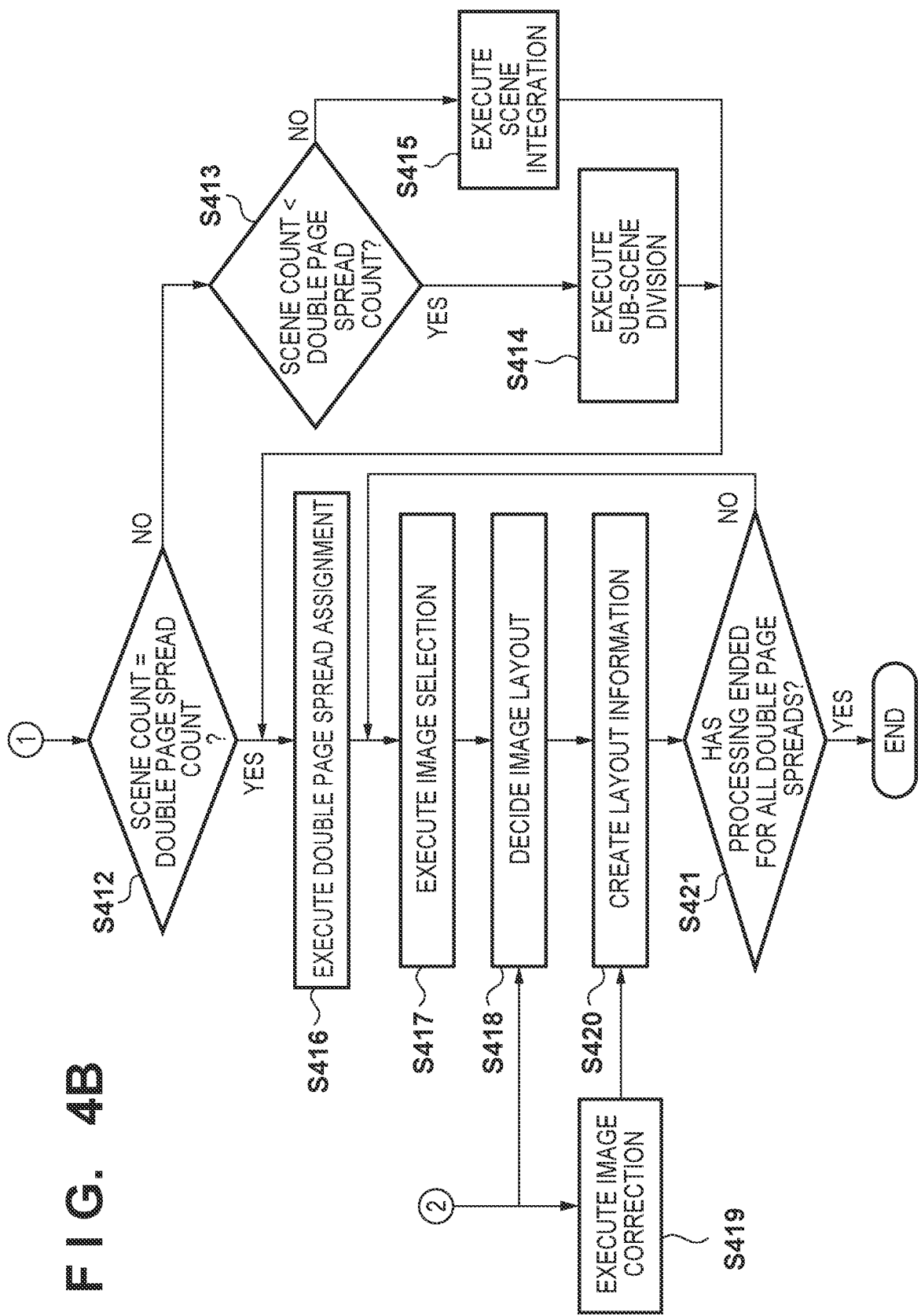

F I G. 5

| IMAGE ID | SHOOTING DATE/TIME | FOCUS | FACE COUNT | PERSONAL ID ||||||  |
|---|---|---|---|---|---|---|---|---|---|---|
| | | | | 1 || 2 || 3 || ... |
| | | | | UPPER LEFT POSITION | LOWER RIGHT POSITION | UPPER LEFT POSITION | LOWER RIGHT POSITION | UPPER LEFT POSITION | LOWER RIGHT POSITION | |
| 1 | 2015/7/1 10h11m12s | ○ | 6 | 40,40 | 65,65 | 90,40 | 115,65 | 10,20 | 25,35 | ... |
| 2 | 2015/7/1 10h12m30s | ○ | 2 | 50,100 | 100,150 | 150,150 | 190,165 | 150,125 | 190,165 | ... |
| 3 | 2015/7/1 10h15m54s | ○ | 0 | — | — | — | — | — | — | ... |
| ... | ... | ... | ... | ... | ... | ... | ... | ... | ... | ... |

F I G. 6A
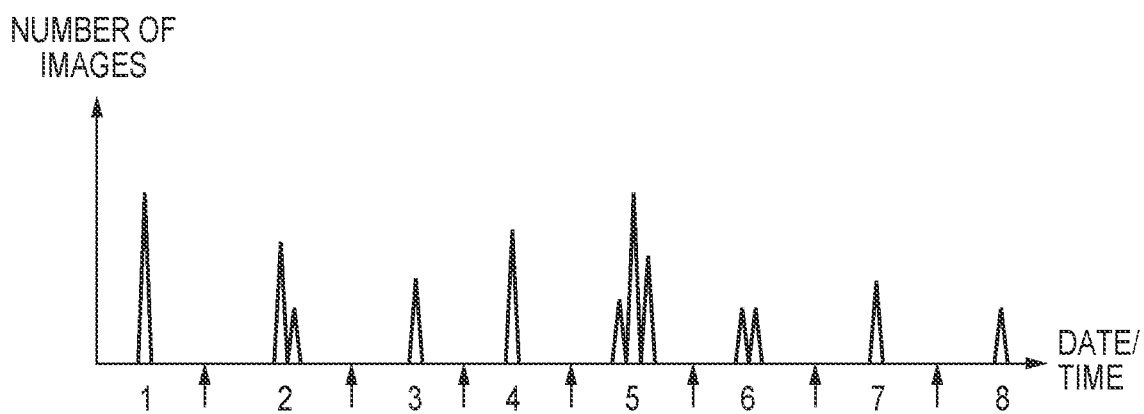
F I G. 6B
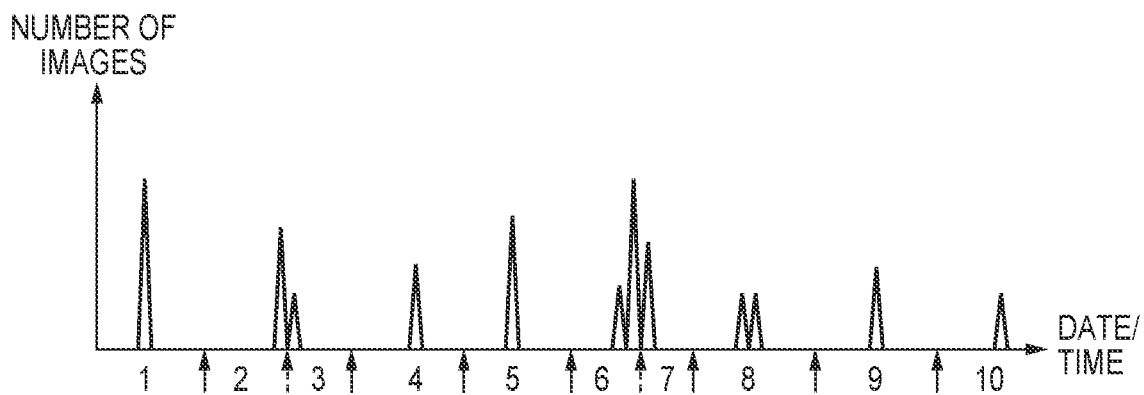
F I G. 6C
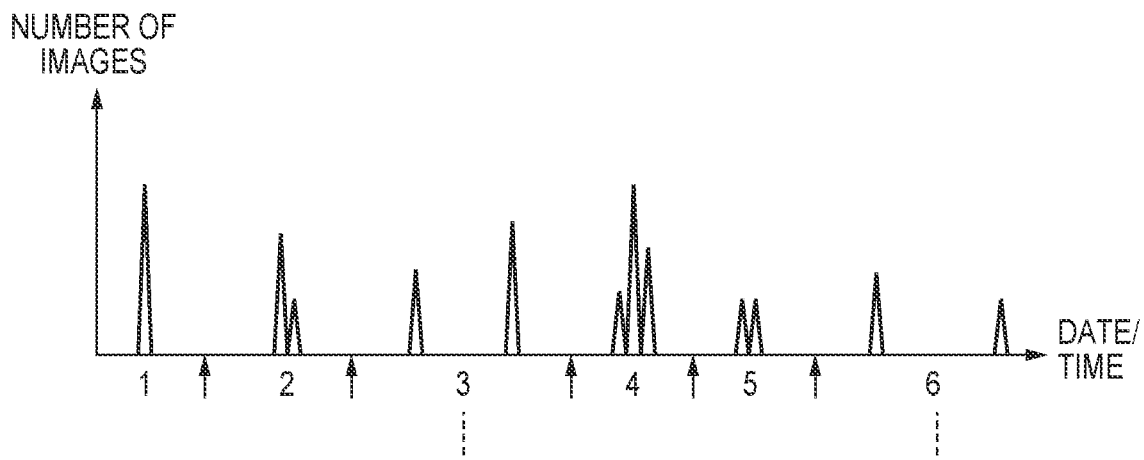

FIG. 7

| SCENE | SHOOTING PERIOD (TIME) | | NUMBER OF SHOT IMAGES | | NUMBER OF SHOT PEOPLE | |
|---|---|---|---|---|---|---|
| | AVERAGE | STANDARD DEVIATION | AVERAGE | STANDARD DEVIATION | AVERAGE | STANDARD DEVIATION |
| TRIP | 33.221 | 4.778 | 324.857 | 393.691 | 1.506 | 0.256 |
| DAILY LIFE | 3.336 | 4.671 | 54.892 | 108.805 | 1.465 | 0.974 |
| CEREMONY | 4.634 | 1.532 | 165.457 | 71.055 | 2.547 | 0.527 |

FIG. 8A

| SCENE | IMAGE FEATURE OF MAIN SLOT | IMAGE FEATURE OF SUB-SLOT |
|---|---|---|
| TRIP | LONG SHOT IMAGE INCLUDING PERSON AND SCENERY | CLOSE-UP IMAGE OR IMAGE OF FACE IN PROFILE |
| DAILY LIFE | CLOSE-UP IMAGE OR IMAGE OF FACE IN PROFILE | LONG SHOT IMAGE INCLUDING PERSON AND SCENERY |
| CEREMONY | IMAGE INCLUDING TWO PEOPLE CLOSE TO EACH OTHER | IMAGE OF MANY PEOPLE |

FIG. 8B

| IMAGE ID | SCORE (MAXIMUM OF 50 POINTS) ||
| | MAIN SLOT (POINTS) | SUB-SLOT (POINTS) |
|---|---|---|
| 1 | 20 | 40 |
| 2 | 45 | 10 |
| 3 | 10 | 20 |
| ... | ... | ... |

FIG. 12A

| SCENE ID | IMAGE COUNT | PERSON COUNT | DEGREE OF IMPORTANCE | SCENE INFORMATION | | DELETION TARGET | SCENE INTEGRATION ID |
|---|---|---|---|---|---|---|---|
| | | | | PERIOD | TIME DIFFERENCE | | |
| 1 | 114 | 100 | 233 | 10hours:57minutes:54seconds | 7days:22hours:43minutes:54seconds | | 1 |
| 2 | 3 | 3 | 9 | 25seconds | 20hours:47minutes:21seconds | | 2 |
| 3 | 63 | 35 | 30 | 4hours:6minutes:20seconds | 10days:21hours:58minutes:36seconds | | 2 |
| 4 | 76 | 55 | 115 | 44minutes:38seconds | 12days:14hours:53minutes:26seconds | | 3 |
| 5 | 913 | 233 | 404 | 4days:7hours:22minutes:22seconds | 10days:18hours:33minutes:43seconds | | 4 |
| 6 | 13 | 13 | 26 | 3hours:1minute:27seconds | 15hours:12minutes:8seconds | | 5 |
| 7 | 15 | 10 | 23 | 2hours:10minutes:39seconds | 1day:10hours:55minutes:1second | | 6 |
| 8 | 3 | 3 | 4 | 14seconds | 20days:16hours:14minutes:44seconds | | 6 |
| 9 | 75 | 54 | 75 | 4hours:11minutes:11seconds | 19days:19hours:22minutes:39seconds | | 7 |
| 10 | 14 | 4 | 6 | 3hours:19minutes:5seconds | 2days:15hours:57minutes:21seconds | | 7 |
| 11 | 1 | 0 | 0 | 0seconds | 18days:4hours:2minutes:10seconds | * | — |
| 12 | 152 | 56 | 33 | 4hours:8minutes:15seconds | 5days:22hours:11minutes:48seconds | | 8 |
| 13 | 123 | 43 | 22 | 2hours:19minutes:58seconds | 20days:18hours:55minutes:15seconds | | 9 |
| 14 | 141 | 64 | 88 | 4hours:52minutes:13seconds | 0seconds | | 10 |

F I G. 12B

| SCENE ID | IMAGE COUNT | PERSON COUNT | DEGREE OF IMPORTANCE | SCENE INFORMATION | | DELETION TARGET | SCENE INTEGRATION ID |
|---|---|---|---|---|---|---|---|
| | | | | PERIOD | TIME DIFFERENCE | | |
| 1 | 114 | 100 | 233 | 10hours:57minutes:54seconds | 7days:22hours:43minutes:54seconds | | |
| 2 | 66 | 38 | 39 | 4hours:6minutes:45seconds | 10days:21hours:58minutes:36seconds | | |
| 3 | 76 | 55 | 115 | 44minutes:38seconds | 12days:14hours:53minutes:26seconds | | |
| 4 | 913 | 233 | 404 | 4days:7hours:22minutes:22seconds | 10days:18hours:33minutes:43seconds | | |
| 5 | 13 | 13 | 26 | 3hours:1minute:27seconds | 15hours:12minutes:8seconds | | |
| 6 | 18 | 13 | 27 | 2hours:10minutes:53seconds | 20days:16hours:14minutes:44seconds | | |
| 7 | 75 | 54 | 75 | 7hours:30minutes:16seconds | 2days:15hours:57minutes:21seconds | | |
| 8 | 152 | 56 | 33 | 4hours:8minutes:15seconds | 5days:22hours:11minutes:48seconds | | |
| 9 | 123 | 43 | 22 | 2hours:19minutes:58seconds | 20days:18hours:55minutes:15seconds | | |
| 10 | 141 | 64 | 88 | 4hours:52minutes:13seconds | 0seconds | | |

INFORMATION PROCESSING METHOD, INFORMATION PROCESSING APPARATUS, AND STORAGE MEDIUM

BACKGROUND OF THE INVENTION

Field of the Invention

The present invention relates to an information processing method for processing image data, an information processing apparatus, and a storage medium.

Description of the Related Art

An image shot by an image generation apparatus such as a digital camera, digital video camera, or scanner is output (displayed and printed) by various image output apparatuses such as a monitor and printer. If a plurality of images are output, a method is used in which a plurality of images are assigned to one double page spread, similarly to an album containing photos, and the images are output for each double page spread. For example, in an album in which images are assigned over a plurality of double page spreads, if the images are simply arranged on the respective double page spreads in a shooting order, the images on each double page spread may not be well organized. Japanese Patent Laid-Open No. 2007-318461 describes a method of laying out respective images by dividing the images on a unit basis of a period such as a date or month.

If all images are divided into a plurality of image groups in a predetermined unit such as a period, each image group is assigned to a double page spread, and then preferred images are selected from the assigned image group to be laid out on the double page spread, the number of divided periods may not match that of double page spreads.

SUMMARY OF THE INVENTION

An aspect of the present invention is to eliminate the above-mentioned problems with the conventional technology. The present invention provides an information processing method for appropriately laying out a plurality of images of layout targets in a plurality of templates, an information processing apparatus, and a storage medium.

The present invention in one aspect provides an information processing method comprising: dividing a plurality of images into a plurality of image groups based on time information indicating a time corresponding to each of the plurality of images; matching, in a case where the number of the plurality of image groups obtained by dividing the plurality of images in the dividing is smaller than a predetermined number, the number of the plurality of image groups with the predetermined number by performing first processing for increasing the number of the plurality of image groups, and matching, in a case where the number of the plurality of image groups obtained by dividing the plurality of images in the dividing is larger than the predetermined number, the number of the plurality of image groups with the predetermined number by performing second processing for decreasing the number of the plurality of image groups; and laying out, in a template, at least one image included in each of the plurality of image groups obtained by the processing in the matching.

According to the present invention, it is possible to appropriately lay out a plurality of images of layout targets in a plurality of templates.

Further features of the present invention will become apparent from the following description of exemplary embodiments with reference to the attached drawings.

BRIEF DESCRIPTION OF THE DRAWINGS

FIGS. 4A and 4B are flowcharts illustrating automatic layout processing;

FIG. 5 is a table showing image analysis information;

FIGS. 6A to 6C are graphs each showing the result of scene division of an image data group;

FIG. 7 is a table showing average values and standard deviations for each scene;

FIGS. 8A and 8B are tables showing the concept of a scoring axis;

FIGS. 12A and 12B are tables each showing scene information of each scene.

DESCRIPTION OF THE EMBODIMENTS

Figure 1:
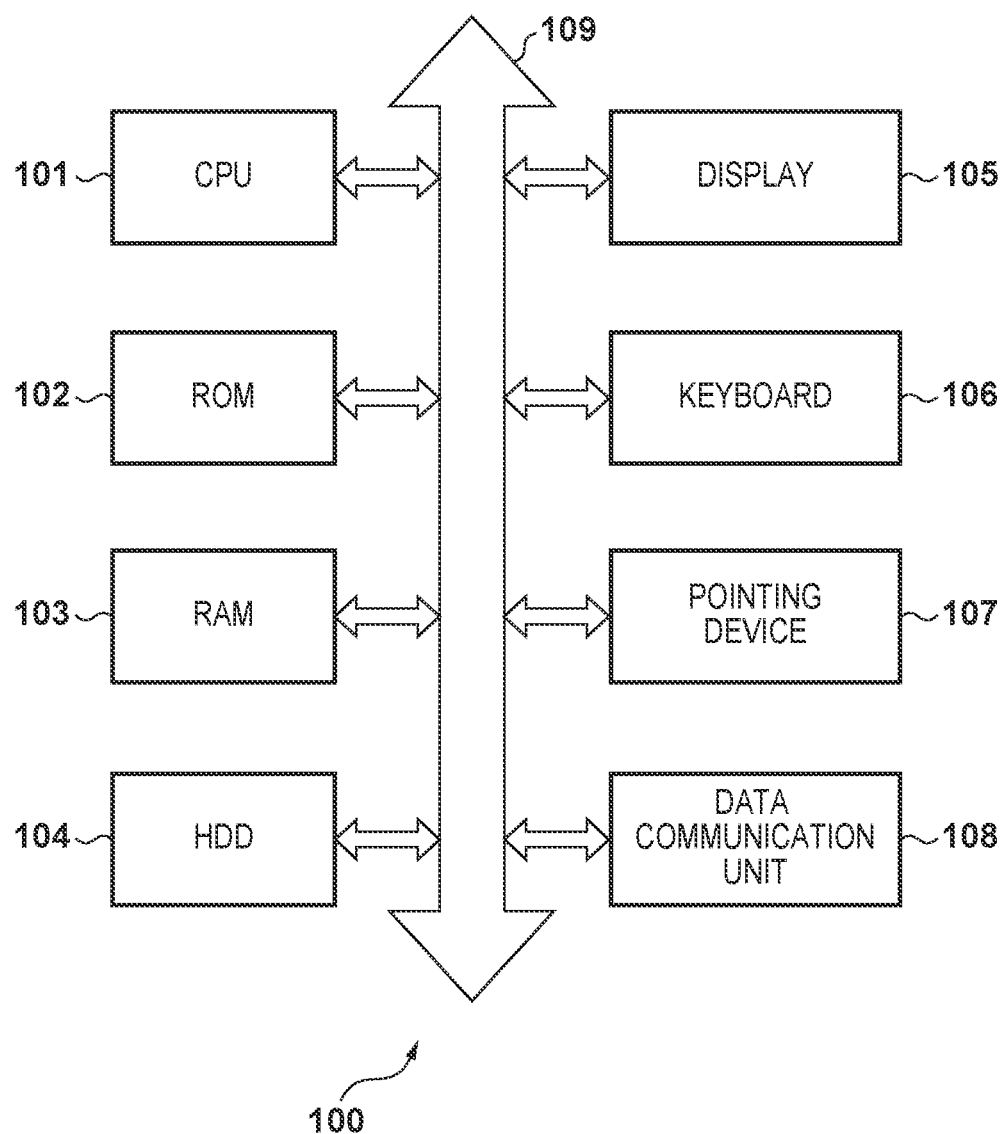
FIG. 1 is a block diagram showing the hardware arrangement of an image processing apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components and a description thereof will be omitted.

First Embodiment

This embodiment will describe processing of operating an album creation application on an image processing apparatus, and generating a layout by an automatic layout function.

FIG. 1 is a block diagram showing the hardware arrangement of the image processing apparatus. Note that examples of the image processing apparatus are a PC and smartphone. In this embodiment, a PC is used. A CPU (Central Processing Unit/Processor) 101 comprehensively controls an image processing apparatus 100, and implements an operation according to this embodiment by, for example, reading out a program stored in a ROM 102 into a RAM 103, and executing it. Referring to FIG. 1, one CPU is included. However, a plurality of CPUs may be included. The ROM 102 is a general-purpose ROM, and stores, for example, a program to be executed by the CPU 101. The RAM 103 is a general-purpose RAM, and is used as, for example, a working memory for temporarily storing various kinds of information at the time of execution of a program by the CPU 101. An HDD (Hard Disk) 104 is a storage medium (storage unit) for storing a database which holds image files and processing results of image analysis and the like, and templates used by the album creation application.

A display 105 displays a user interface (UI) of this embodiment and the layout result of images to the user. A keyboard 106 and a pointing device 107 accept instruction operations from the user. The display 105 may have a touch sensor function. The keyboard 106, for example, is used by the user to input the double page spread count of an album to be created on the UI displayed on the display 105. The pointing device 107, for example, is used by the user to click a button on the UI displayed on the display 105.

A data communication unit 108 communicates with an external apparatus via a network such as a wired or wireless network. For example, the data communication unit 108 transmits data laid out by the automatic layout function to a printer or server communicable with the image processing apparatus 100. A data bus 109 communicably connects the respective blocks shown in FIG. 1.

The album creation application according to this embodiment is saved in the HDD 104, and is activated when the user double-clicks, by the pointing device 107, the icon of the application displayed on the display 105, as will be described later.

Figure 2:
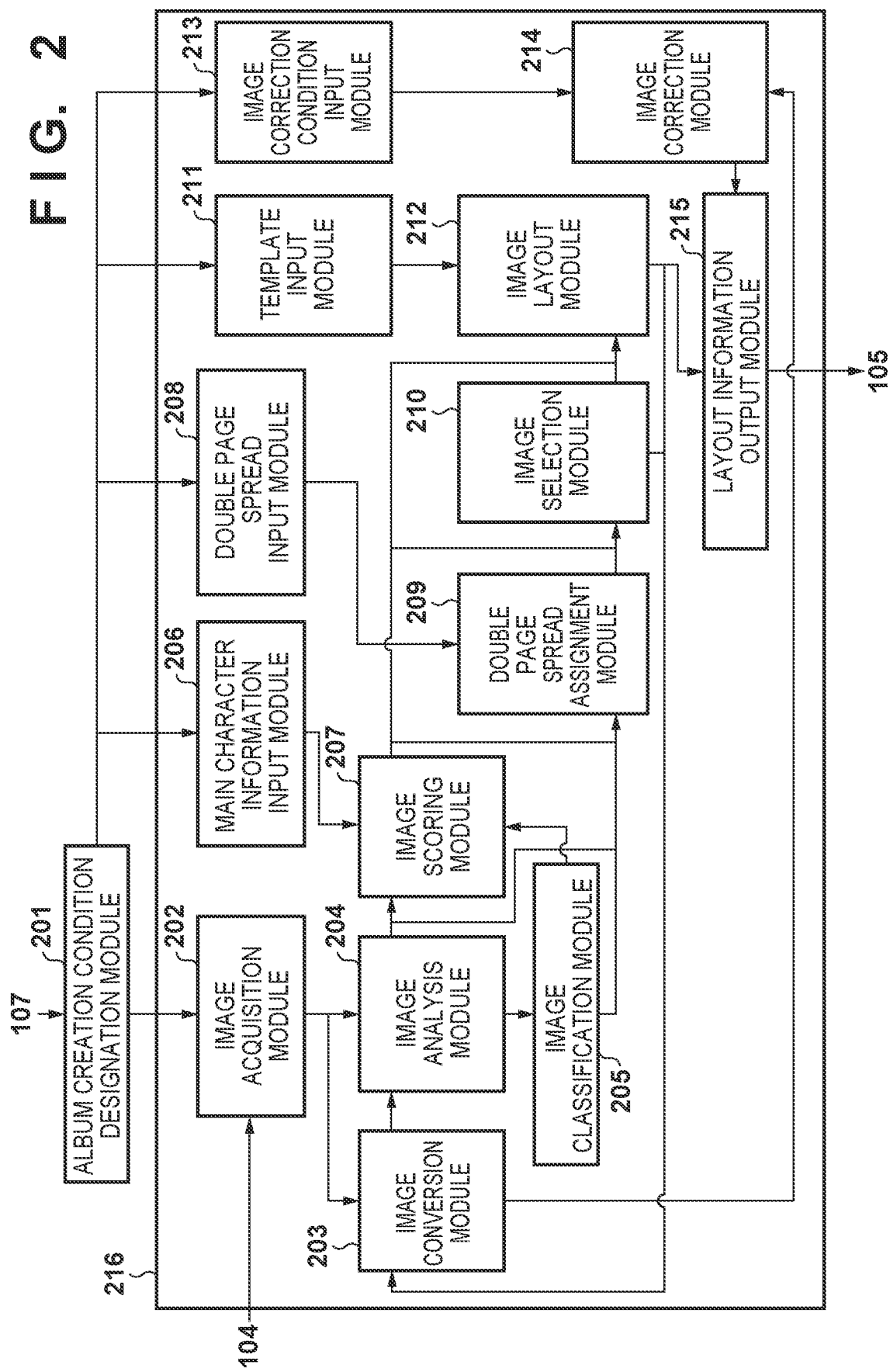
FIG. 2 is a software block diagram showing an album creation application.

FIG. 2 is a software block diagram showing the album creation application. FIG. 2 is a software block diagram specifically showing an automatic layout processing module 216 for executing the automatic layout function. An album creation condition designation module 201 outputs, to the automatic layout processing module 216, album creation conditions corresponding to a user's UI operation (to be described later) by the pointing device 107. Note that the CPU 101 functions as each block shown in FIG. 2 by executing the album creation application saved in the HDD 104.

An image acquisition module 202 acquires, from the HDD 104, an image data group designated by the album creation condition designation module 201. An image conversion module 203 converts, into image data of a desired pixel count and color information, image data to be used for subsequent processing. In this embodiment, the image conversion module 203 converts image data into analysis image data of a pixel count of 420 pixels on a short side and sRGB color information. An image analysis module 204 executes each of feature amount acquisition processing, face detection processing, expression recognition processing, and personal recognition processing (to be described later) based on the analysis image data. The image analysis module 204 also acquires data added to the image data acquired from the HDD 104, for example, acquires a shooting date/time from Exif information. An image classification module 205 executes scene division and scene classification (both will be described later) for the image data group using shooting date/time information, the number of shot images, detected face information, and the like. A scene indicates a shooting scene such as a trip, daily life, or wedding ceremony. An image scoring module 207 scores each image data so that an image appropriate for the layout has a high score. As will be described later, the image scoring module 207 performs scoring using the information from the image analysis module 204 and the information from the image classification module.

A main character information input module 206 inputs, to the image scoring module 207, the ID (identification information) of a main character instructed by the album creation condition designation module 201. The image scoring module 207 is configured to add a higher score to image data including the main character ID input from the main character information input module 206.

A double page spread assignment module 209 divides an image data group and assigns image data to each double page spread of the album. A double page spread input module 208 inputs, to the double page spread assignment module 209, the double page spread count of the album designated from the album creation condition designation module 201. The double page spread count of the album corresponds to the number of a plurality of templates in which a plurality of images are arranged. The double page spread assignment module 209 divides the image data group in accordance with the input double page spread count, and assigns some data (divided data) of the image data group to each double page spread. Based on the scores added by the image scoring module 207, an image selection module 210 selects, from some data of the image data group assigned to each double page spread by the double page spread assignment module 209, image data as many as the number of slots designated from the album creation condition designation module 201.

An image layout module 212 decides the layout of the image data. A template input module 211 inputs, to the image layout module 212, a plurality of templates corresponding to template information designated from the album creation condition designation module 201. The image layout module 212 selects, from the plurality of templates input from the template input module 211, a template suitable for the image data selected by the image selection module 210, and decides the layout of the image data. A layout information output module 215 outputs layout information for displaying the image data on the display 105 in accordance with the layout of the image data decided by the image layout module 212. The layout information is, for example, bitmap data obtained by laying out, in the selected template, the image data selected by the image selection module 210.

An image correction module 214 executes dodging correction (luminance correction), red-eye correction, and contrast correction. An image correction condition input module 213 inputs, to the image correction module 214, an ON/OFF condition of image correction designated from the album creation condition designation module 201. If the image correction condition is ON, the image correction module 214 corrects the image data. If the image correction condition is OFF, the image correction module 214 does not correct the image data. Note that the image correction module 214 corrects the image data input from the image conversion module 203 in accordance with ON/OFF of correction. The pixel count of the image data input from the image conversion module 203 to the image correction module 214 can be changed in accordance with the size of the layout decided by the image layout module 212.

When the album creation application is installed in the image processing apparatus 100, an activation icon is displayed on the top screen (desktop) of an OS (Operating System) operating on the image processing apparatus 100. When the user double-clicks, by the pointing device 107, the activation icon on the desktop displayed on the display 105, the program of the album creation application saved in the HDD 104 is loaded into the ROM 102. When the CPU 101 reads out the program in the ROM 102 into the RAM 103, and executes it, the album creation application is activated.

Figure 3:
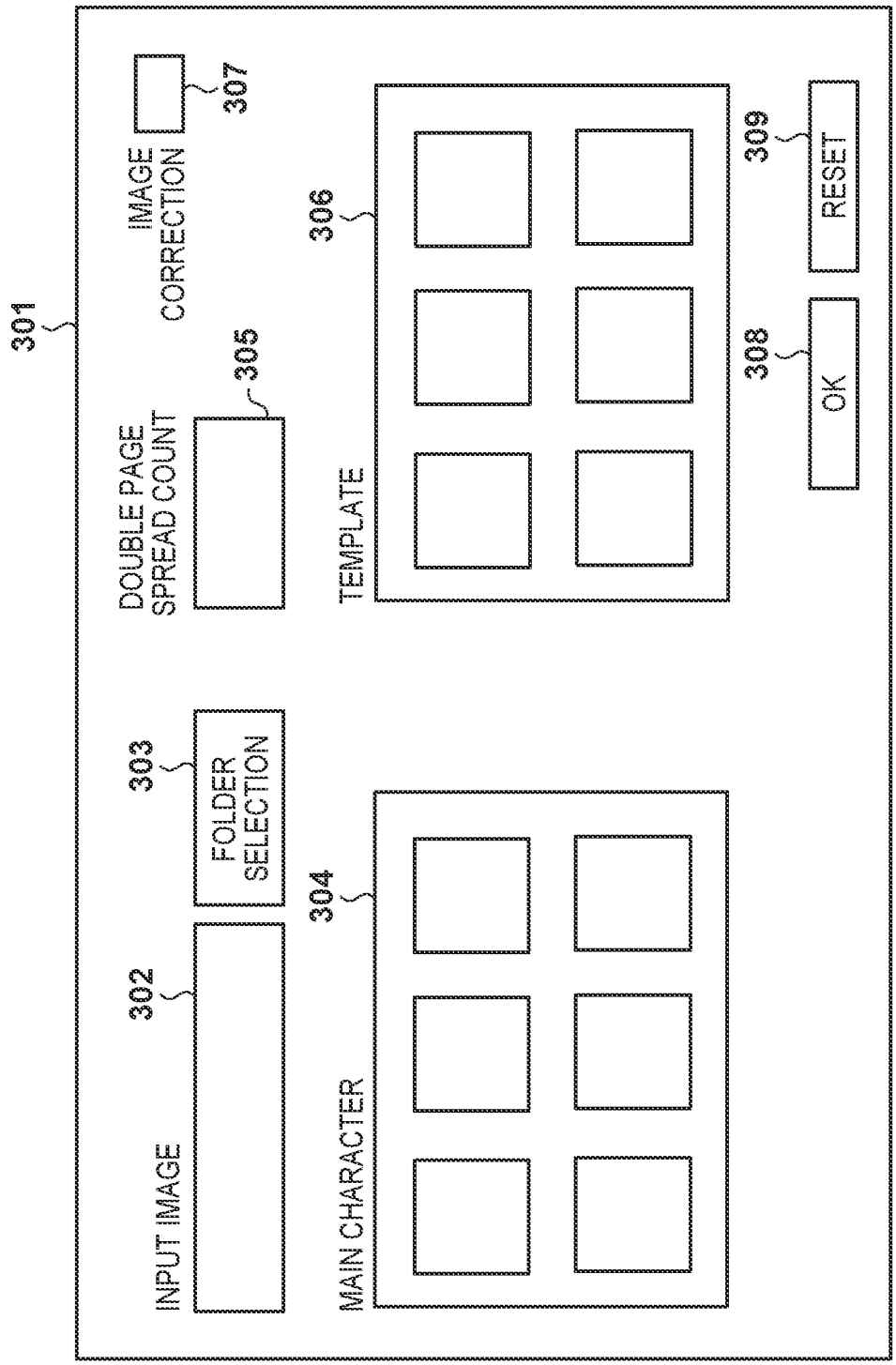
FIG. 3 is a view showing a display screen provided by the album creation application.

FIG. 3 is a view showing an example of a display screen 301 provided by the album creation application. The display screen 301 is displayed on the display 105. The user sets album creation conditions (to be described later) via the display screen 301, and the album creation condition designation module 201 acquires the setting contents from the user.

A path box 302 on the display screen 301 displays the save location (path), in the HDD 104, of the image data group as an album creation target. When the user performs a click operation on a folder selection button 303 using the pointing device 107, a folder including the image data group as an album creation target is displayed in a tree structure to be selectable by the user. A folder path including the image data group selected by the user is displayed in the path box 302.

A main character designation icon 304 is an icon used by the user to designate a main character. A face image of a person is displayed as an icon. Icons of a plurality of different face images are arranged and displayed in the main character designation icon 304, and can be selected by the user by clicking using the pointing device 107. A double page spread count box 305 accepts a setting of the double page spread count of the album from the user. The user directly inputs a numerical to the double page spread count box 305 via the keyboard 106, or inputs a numerical to the double page spread count box 305 from a list using the pointing device 107.

A template designation icon 306 displays illustration images for respective styles (pop art style, chic style, and the like) of templates. A plurality of template icons are arranged and displayed in the template designation icon 306, and can be selected by the user by clicking using the pointing device 107. A checkbox 307 accepts designation of ON/OFF of image correction from the user. If the checkbox 307 is checked, image correction ON is designated. If the checkbox 307 is not checked, image correction OFF is designated.

When the user presses an OK button 308, the album creation condition designation module 201 acquires the contents set on the display screen 301. The album creation condition designation module 201 outputs the acquired setting contents to the automatic layout processing module 216 of the album creation application. At this time, the path input to the path box 302 is transferred to the image acquisition module 202. The personal ID of the main character selected in the main character designation icon 304 is transferred to the main character information input module 206. The double page spread count input to the double page spread count box 305 is transferred to the double page spread input module 208. The template information selected in the template designation icon 306 is transferred to the template input module 211. The ON/OFF designation of image correction in the image correction checkbox 307 is transferred to the image correction condition input module 213. A reset button 309 on the display screen 301 is a button used to reset the respective pieces of setting information on the display screen 301.

Figure 4A:
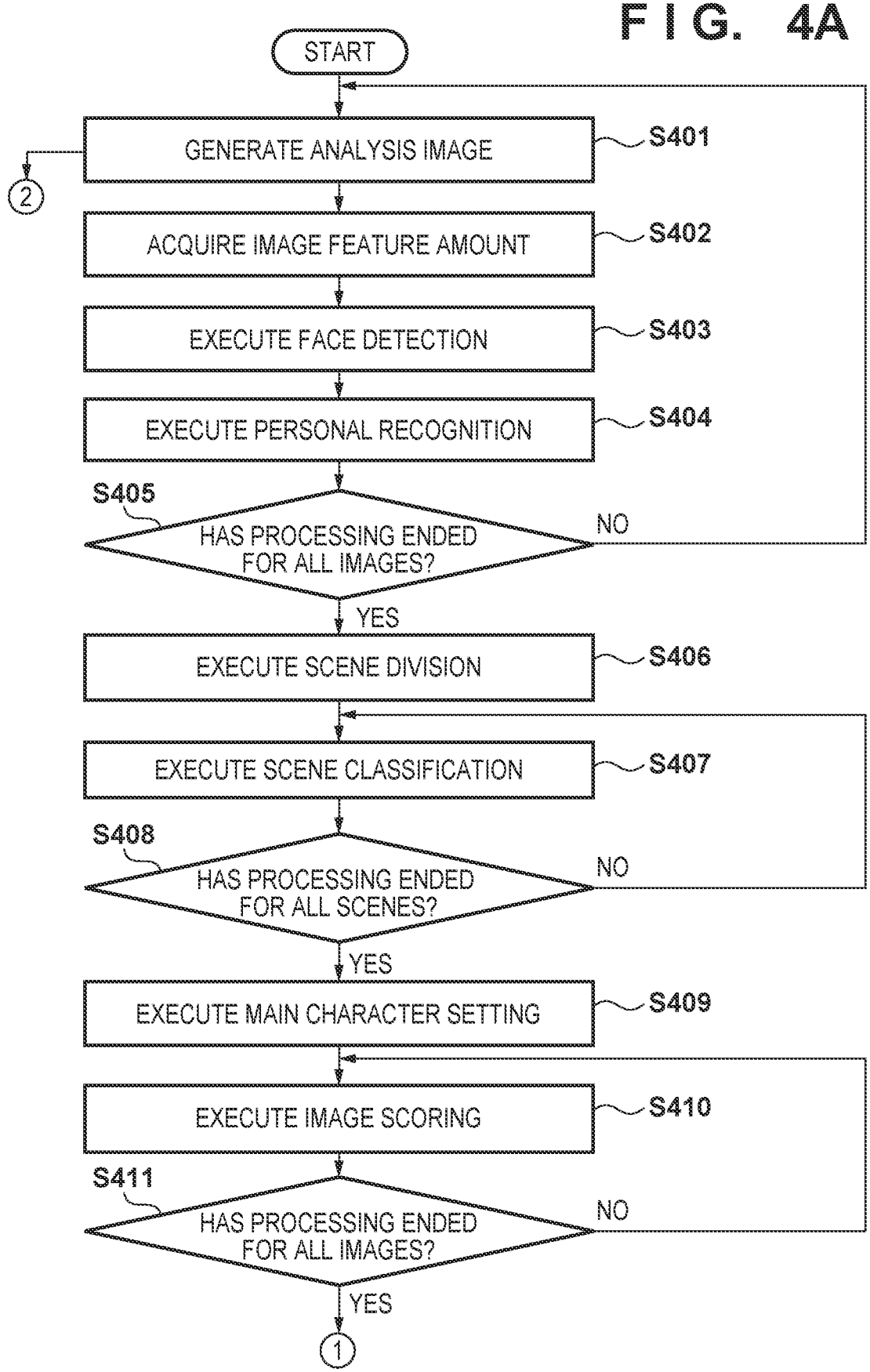

FIGS. 4A and 4B are flowcharts illustrating the processing of the automatic layout processing module 216 of the album creation application. The flowcharts shown in FIGS. 4A and 4B are implemented when, for example, the CPU 101 reads out the program stored in the HDD 104 into the ROM 102 or the RAM 103 and executes it. Automatic layout processing will be described with reference to FIGS. 4A and 4B.

In step S401, the image conversion module 203 generates analysis image data. The image conversion module 203 converts each image data of the image data group in the HDD 104, which has been designated by the album creation condition designation module 201, into analysis image data of a desired pixel count and color information. In this embodiment, the image conversion module 203 converts each image data into analysis image data of a pixel count of 420 pixels on a short side and sRGB color information.

In step S402, the image analysis module 204 acquires an image feature amount. For example, the image analysis module 204 acquires, from Exif information, a shooting date/time added to each image data acquired from the HDD 104. The image analysis module 204 acquires a feature amount from the analysis image data generated in step S401. An example of the feature amount is focus. A Sobel filter is generally known as an edge detection method. The Sobel filter is used to perform edge detection, and the gradient of an edge is calculated by dividing the luminance difference between the start and end points of the edge by the distance between the start and end points. Based on the result of calculating the average gradient of the edges in the image, an image having a large average gradient can be considered to be in better focus than an image having a small average gradient. If a plurality of different thresholds are set for the gradient, it is possible to output the evaluation value of a focus amount by determining a threshold equal to or smaller than the gradient. In this embodiment, two different thresholds are preset, and a focus amount is determined in three levels of ○, Δ, and ×. For example, the gradient of the focus to be adopted for the album is determined as ○, the allowable gradient of the focus is determined as Δ, and the unallowable gradient is determined as ×, thereby presetting each threshold. For example, each threshold may be provided by the creation source of the album creation application or the like, or may be settable on the user interface.

In step S403, the image analysis module 204 executes face detection for the analysis image data generated in step S401. A well-known method can be used for the face detection processing. For example, Adaboost for creating a strong discriminator from a plurality of prepared weak discriminators is used. In this embodiment, the strong discriminator created by Adaboost is used to detect a face image of a person (object). The image analysis module 204 extracts a face image, and acquires the upper left coordinate value and lower right coordinate value of the position of the detected face image. By having these two kinds of coordinates, the image analysis module 204 can acquire the position and size of the face image. A strong discriminator may be created by Adaboost by setting, as a detection target, an object such as an animal like a dog or cat, a flower, a food, a building, or a decorative object instead of the face. This allows the image analysis module 204 to detect an object other than the face image.

In step S404, the image analysis module 204 performs personal recognition by comparing the similarities between the face image detected in step S403 and representative face images saved in a face dictionary database for respective personal IDs. The image analysis module 204 sets, as the ID of the detected face image, an ID having the highest similarity which is equal to or larger than a threshold. Note that if the similarity is smaller than the threshold, the image analysis module 204 registers the extracted face image as a new face with a new personal ID in the face dictionary database.

The image analysis module 204 discriminates the image analysis information acquired in steps S402 to S404 for each ID for identifying each image, as shown in FIG. 5, and stores it in a storage area such as the RAM 103. For example, as shown in FIG. 5, the shooting date/time information and focus determination result acquired in step S402 and the number of face images and position information detected in step S403 are stored in a table format. Note that the position information of the face image is discriminated and stored for each personal ID acquired in step S404.

In step S405, it is determined whether the processes in steps S401 to S404 have ended for all the image data of the image data group in the HDD 104, which has been designated by the album creation condition designation module 201. If it is determined that the processes have not ended, the process is repeated from step S401; otherwise, the process advances to step S406.

In step S406, the image classification module 205 executes scene division. The image classification module 205 divides the image data group into a plurality of scenes based on the time difference between the images, which has been calculated from the shooting date/time information acquired in step S402. In this embodiment, for example, if a date when no shooting is performed exists between the image data, the image data group is divided with reference to that portion. Division may be performed based on another criterion. For example, when performing division even if shooting dates are consecutive, division is performed with reference to a portion where the time difference is 16 hours or longer. When the time difference is shorter than 16 hours, if the time difference between the first shooting operation and the last shooting operation on each of the consecutive dates is shorter than four hours, division is performed. When the time difference is equal to or longer than four hours, if the number of shot images on each of the consecutive dates is smaller than 50, division is performed. If the number of shot images is equal to or larger than 50, no division is performed. FIG. 6A is a graph showing an example of the result of performing scene division for the image data group by the above scene division method.

In step S407, the image classification module 205 executes scene classification. In this embodiment, the image classification module 205 classifies divided image data obtained by executing scene division into one of trip, daily life, and ceremony scenes. In this example, before starting the automatic layout processing of FIGS. 4A and 4B, the user collects and designates in advance a plurality of image data determined as a trip, daily life or ceremony scene.

Designation performed in advance by the user will now be described.

For example, the album creation condition designation module 201 accepts designation of a plurality of image data determined by the user as a trip scene on a user interface screen (not shown). The image analysis module 204 acquires feature amounts for the image data. The acquired feature amounts are, for example, a shooting period, the number of shot images, and the number of shot people. The shooting period is the time difference between the first shooting operation and the last shooting operation of the plurality of image data. The number of shot images is the number of the plurality of image data. The number of shot people is the number of shot faces. As a result, for one image data group of the plurality of image data determined by the user as a trip scene, the feature amounts of the shooting period, the number of shot images, and the number of shot people are acquired.

The image analysis module 204 acquires feature amounts of a shooting period, the number of shot images, and the number of shot people for another image data group further designated by the user. Based on the feature amounts acquired from the plurality of image data groups, the image analysis module 204 obtains the average value and standard deviation of the shooting periods, those of the numbers of shot images, and those of the numbers of shot people. FIG. 7 shows the obtained average values and standard deviations. The image analysis module 204 stores in advance these values in the storage area such as the ROM 102. Alternatively, these values may be embedded in advance in the program of the album creation application.

The processing of FIGS. 4A and 4B will be explained again. After activating the album creation application, the image classification module 205 calculates the score of each of the feature amounts of the shooting period, the number of shot images, and the number of shot people for each divided data obtained by performing, in step S406, scene division for the image data group designated by the user in the path box 302. The image classification module 205 calculates the score of each of the shooting period, the number of shot images, and the number of shot people of each divided data, and the average score of the calculated scores using the average value and standard deviation for each scene shown in FIG. 7 by:

$$\text{score}=50-|10\times(\text{average value}-\text{feature amount})/\text{standard deviation}| \quad (1)$$

$$\text{average score}=(\text{score of shooting period}+\text{score of number of shot images}+\text{score of number of shot people})/\text{number of feature amount items} \quad (2)$$

As a result of the calculation, an average score for each of the trip, daily life, and ceremony scenes is calculated for the image data of each divided data. The image classification module 205 classifies the image data of each divided data into the scene corresponding to the highest score. If there are scenes having the equal scores, classification is performed in accordance with the predetermined priority level of each scene. For example, in this embodiment, the priority levels of daily life>ceremony>trip are determined, and the daily life scene has the highest priority level. For example, for image data group 5 shown in FIG. 6A after scene division, a shooting period is 36 hours, the number of shot images is 300, and the number of shot people is 1.7. The average score of the trip scene calculated by equations (1) and (2) is 45.32, the average score of the daily life scene is 18.38, and the average score of the ceremony scene is −29.92. Therefore, image data group 5 is classified into the trip scene. The image classification module 205 assigns a scene ID to the scene, into which the image data group is classified, so as to be identifiable, thereby managing the scene.

In step S408, it is determined whether the scene classification processing in step S407 has ended for all divided data obtained by performing division in step S406. If it is determined that the scene classification processing has not ended, the process is repeated from step S407; otherwise, the process advances to step S409.

In step S409, the image scoring module 207 executes main character setting. Main character setting is executed, by one of two kinds of setting methods, that is, automatic and manual setting methods, for the image data group designated by the user. The image scoring module 207 can acquire the number of times each personal ID appears in the image data group, the number of times each personal ID appears in each scene, the number of scenes in which each personal ID appears, and the like from the result of personal recognition executed in step S404 and the result of scene division executed in step S406. The image scoring module 207 automatically sets a main character based on the pieces of information regardless of user designation. In this embodiment, if there are a plurality of scenes, the image scoring module 207 sets, as a main character ID, a personal ID which appears in the plurality of scenes a large number of times. If there is one scene, the image scoring module 207 sets, as a main character ID, a personal ID which appears in the scene a large number of times.

If the user designates the main character designation icon 304, the main character information input module 206 transfers the designated personal ID to the image scoring module 207. If the user designates the personal ID, the image scoring module 207 sets, as a main character ID, the personal ID designated by the user regardless of the automatically set main character ID. This setting will be referred to as manual setting hereinafter.

Figure 10:
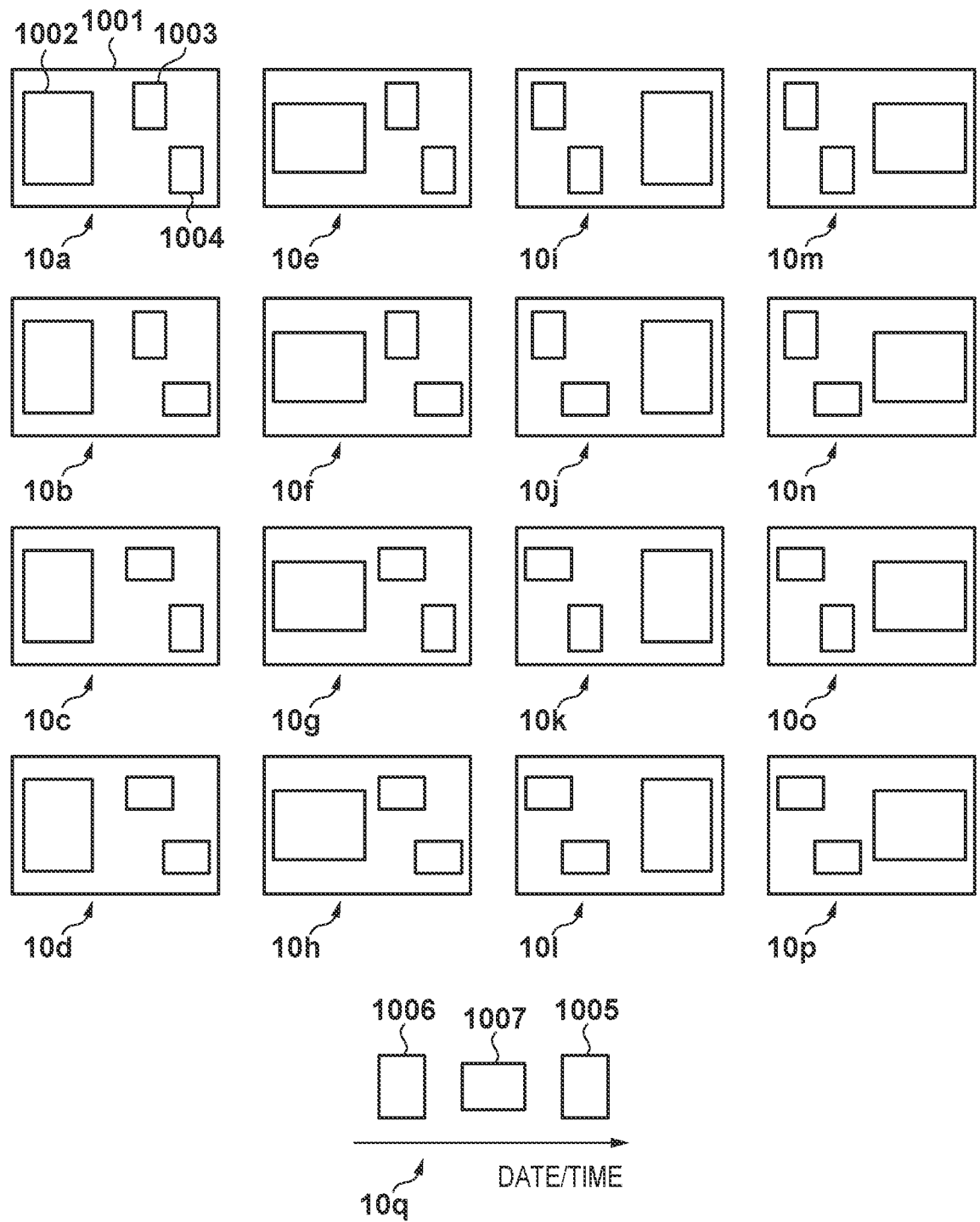
FIG. 10 is a view showing a template group to be used to lay out image data.

In step S410, the image scoring module 207 executes scoring. Scoring is to assign (score) a score obtained by evaluating each image data in terms of the following points. The score is referred to when selecting image data to be used for the layout (to be described later). FIG. 10 is a view showing a template group to be used to lay out the image data. Each of a plurality of templates included in the template group corresponds to each double page spread. A template 1001 is one template, a slot 1002 indicates a main slot, and slots 1003 and 1004 indicate sub-slots. The main slot 1002 is a main slot (a frame where an image is laid out) in the template 1001, and is larger in size than the sub-slots 1003 and 1004. The image scoring module 207 assigns a main slot score and a sub-slot score to each image data.

FIG. 8A is a table showing the features of images selected for the album with respect to the main slot and sub-slot for each of the trip, daily life, and ceremony scenes.

Before starting the automatic layout processing of FIGS. 4A and 4B, the user collects and designates in advance a plurality of image data determined to comply with the features for the main slot and sub-slot of each scene shown in FIG. 8A.

Designation performed in advance by the user will now be described.

For example, the album creation condition designation module 201 accepts designation of a plurality of image data determined by the user to be suitable for the main slot (or sub-slot) of the trip scene on a user interface screen (not shown). The image analysis module 204 acquires feature amounts of the face count, face position, and face size of each of the designated image data. As a result, the feature amounts of the face count, face position, and face size are acquired for each of the plurality of image data determined by the user to be suitable for the main slot (or sub-slot) of the trip scene. The image analysis module 204 obtains the average value and standard deviation of the face counts, and those of the face positions, and those of the face sizes. The image analysis module 204 obtains the average value and standard deviation as statistic values of each feature amount for each slot type (each of the main slot and sub-slot) of each scene, as described above. The image analysis module 204 stores in advance these values in the storage area such as the ROM 102. Alternatively, the values may be embedded in the program of the album creation application.

The image scoring module 207 can acquire, from the result of scene classification in step S407, a scene to which each image data belongs. The image scoring module 207 calculates an average score using the above average values and standard deviations obtained in advance and corresponding to the scene of the image data of interest and the respective feature amounts of the face count, face position, and face size of the main character ID of the image data of interest by:

$$\text{score}=50-|10\times(\text{average value}-\text{feature amount})/\text{standard deviation}| \quad (3)$$

$$\text{average score}=(\text{score of face count}+\text{score of face position}+\text{score of face size})/\text{feature amount item count} \quad (4)$$

The image scoring module 207 executes scoring for both the main slot and the sub-slot. Since an image to be used for the album is more preferably in focus, a predetermined score may be added for image data of an image ID having ○ as the feature amount of the focus shown in FIG. 5. FIG. 8B shows an example of the score result of the above scoring, in which each image ID is scored for the main slot and sub-slot.

That is, in this embodiment, conditions suitable for the main slot and sub-slot are determined for each scene, as shown in FIG. 8A. The user designates in advance image data determined to be suitable for the main slot and sub-slot. The image analysis module 204 acquires the feature amounts of the face count, face position, and face size for each image data designated by the user, and obtains the average value and standard deviation for each feature amount. After activating the album creation application, if the automatic layout processing of FIGS. 4A and 4B starts, a score (similarity) indicating how much each image data (having undergone scene classification) as an automatic layout processing target is close to a user criterion for, for example, the main slot is obtained. For example, referring to FIG. 8B, image ID 1 is assigned with 20 points for the main slot, and image ID 2 is assigned with 45 points for the main slot. That is, image ID 2 is closer to the user criterion for the main slot.

FIGS. 4A and 4B will be referred to again.

In step S411, the image scoring module 207 determines whether image scoring in step S410 has ended for all the image data of the image data group designated by the user. If it is determined that scoring has not ended, the process is repeated from step S410; otherwise, the process advances to step S412.

In this embodiment, the image layout module 212 lays out images included in each of the plurality of scenes in each of the plurality of templates (plurality of double page spreads) respectively corresponding to the plurality of scenes. Thus, the number of the plurality of scenes needs to match that of the plurality of templates (the predetermined number of double page spreads).

In step S412, the double page spread assignment module 209 determines whether the division count of scene division in step S406 is equal to the double page spread count of the album input from the double page spread input module 208. If it is determined that these counts are not equal to each other, the process advances to step S413; otherwise, the process advances to step S416. For example, if the scene division count is 8, as shown in FIG. 6A, and the input count of the double page spread input module 208 is 8, the process advances to step S416.

In step S413, the double page spread assignment module 209 determines whether the division count of scene division in step S406 is smaller than the double page spread count (the number of templates used for the album) input from the double page spread input module 208. If it is determined that the division count is not smaller (is equal to or larger) than the double page spread count, the process advances to step S415; otherwise, the process advances to step S414. If the scene division count is 8, as shown in FIG. 6A, and the input count of the double page spread input module 208 is 10, the process advances to step S414.

In step S414, the double page spread assignment module 209 executes sub-scene division. Sub-scene division indicates processing of subdividing divided scenes when "scene division count<double page spread count of album" is satisfied. A case in which the designated double page spread count of the album is 10 while the scene division count is 8, as shown in FIG. 6A, will be described. FIG. 6B shows a result of performing sub-scene division in the state shown in FIG. 6A. The division number is changed to 10 by dividing the scenes at positions indicated by broken arrows.

A division criterion will be described. The divided image groups of FIG. 6A are searched for a divided image group including a large number of images. To increase the division count by two from 8 to 10, two image groups each including a large number of images are decided. In FIG. 6A, image group 5 and image groups 1 and 2 are decided in descending order of the number of images. Since the numbers of images of image groups 1 and 2 are equal to each other but image group 2 has a larger time difference between the first image and the last image, image group 2 is decided as a division target, and image groups 5 and 2 are respectively divided.

Division of image group 2 will be described first. Since image group 2 includes two peaks with respect to the number of images, which have different shooting dates, it is divided at the position of the broken arrow shown in FIG. 6B, which corresponds to the position between the two peaks. Division of image group 5 will be described next. Image group 5 includes three peaks with respect to the number of images, which indicate three consecutive dates. There are two positions at which the shooting date changes. Image group 5 is divided at the position of the broken arrow shown in FIG. 6B so that the difference in the number of images after division is small. As described above, the division count is changed from 8 to 10. In this example, division is performed at a position at which the shooting date changes. If an image group including a large number of images has one shooting date, it may be divided at a position where the time difference is largest on the shooting date.

In step S415, the double page spread assignment module 209 executes scene integration. Scene integration indicates processing of integrating the divided scenes when "scene division count>double page spread count of album" is satisfied. FIG. 6C shows a result of executing scene integration in the state shown in FIG. 6A. The division count is changed to 6 by integrating the scenes at positions indicated by broken lines.

An integration criterion will be described. The divided image groups of FIG. 6A are searched for a divided image group including a small number of images. To decrease the division count by two from 8 to 6, two image groups each including a small number of images are decided. In FIG. 6A, image groups 8, 3, and 7 are decided in ascending order of the number of images. The numbers of images of image groups 3 and 7 are equal to each other. Since, however, image group 8 adjacent to image group 7 is an integration target, image group 3 is decided as an integration target. As a result, each of image groups 8 and 3 undergoes integration.

Integration of image group 3 will be described. By comparing the time differences between image group 3 and preceding and succeeding image groups 2 and 4 of image group 3, it is determined that the time difference from image group 4 is smaller. Therefore, image group 3 is integrated with image group 4, as indicated at the position of the broken line in FIG. 6C. Integration of image group 8 will be described next. Since image group 8 has no succeeding image group, it is integrated with preceding image group 7, as indicated at the position of the broken line in FIG. 6C.

In step S416, the double page spread assignment module 209 executes double page spread assignment. In steps S412 to S415, the scene division count is equal to the designated double page spread count. The double page spread assignment module 209 assigns the first divided image group to the first double page spread in the shooting date order.

Figure 9:
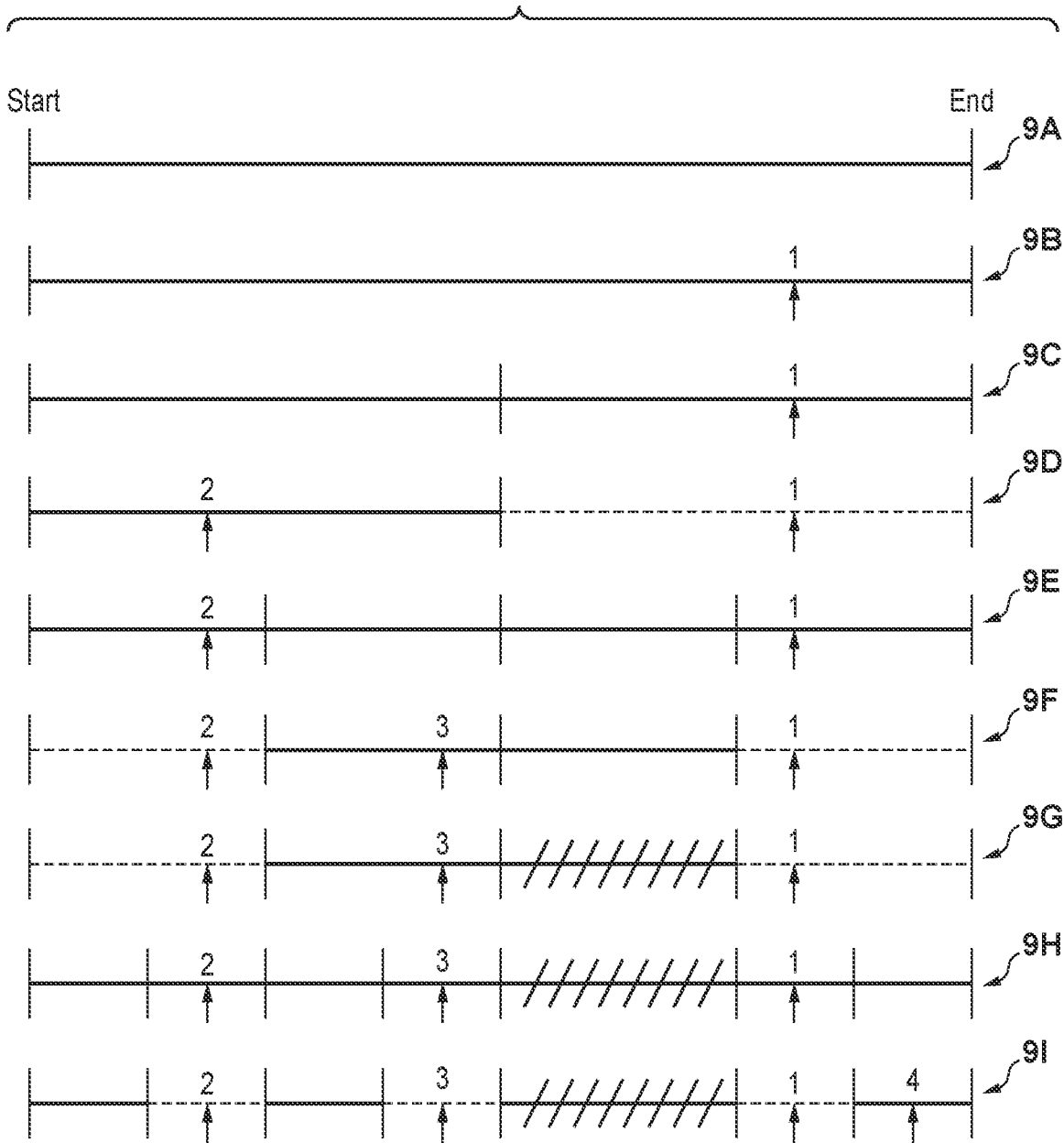
FIG. 9 is a view for explaining selection of image data.

In step S417, the image selection module 210 executes image selection. An example of selecting four image data from the divided data of the image data group assigned to a given double page spread will be described below with reference to FIG. 9.

A section shown in 9A between the start and end indicates the time difference (divided shooting period) between the shooting dates/times of the first image data and last image data of the divided data assigned to the double page spread. A method of selecting the first image data will be described with referenced to 9B. A template includes the one main slot 1002. Therefore, image data for the main slot is selected as the first image data. Image data having the highest score for the main slot, which has been assigned in step S410, is selected from a plurality of image data corresponding to the shooting period of the divided data shown in 9B. Image data for sub-slots are selected as the second and subsequent image data.

In this embodiment, image selection is made so as not to concentrate on part of the shooting period of the divided data. A method of subdividing the shooting period of the divided data according to this embodiment will be described below. As shown in 9C, the shooting period of the divided data is divided into two parts. Next, as shown in 9D, the second image data is selected from the shooting period indicated by a solid line during which the first image data has not been selected. Image data having the highest score for the sub-slot is selected from a plurality of image data corresponding to the shooting period indicated by the solid line in 9D.

As shown in 9E, each of the shooting periods of the divided data in 9D is divided into two parts. As shown in 9F, image data having the highest score for the sub-slot is selected as the third image data from a plurality of image data corresponding to the shooting periods indicated by solid lines during which neither the first image data nor the second image data has been selected.

A case in which no image data exists in the shooting period during which image data is to be selected and thus no image data can be selected will be described by exemplifying selection of the fourth image data. In an example shown in 9G, when selecting the fourth image data from a hatched shooting period during which no image data has been selected, there is no image data in the hatched shooting period. In this case, as shown in 9H, each of the shooting periods of the divided data is divided into two parts. Next, as shown in 9I, image data having the highest score for the sub-slot is selected as the fourth image data from a plurality of image data corresponding to the shooting periods indicated by solid lines during which none of the first to third image data has been selected.

Referring back to FIG. 4B, in step S418, the image layout module 212 decides an image layout. An example in which the template input module 211 inputs one of 10a to 10p of FIG. 10 to a given double page spread in accordance with the designated template information will be described.

In this example, 3 is designated as the slot count of the input template, as an example. Three selected image data are sorted in the shooting date/time order so as to indicate whether the orientation of each image is the portrait or landscape orientation, as shown in 10q. Image data 1005 is used for the main slot and image data 1006 and 1007 are used for the sub-slots. In this embodiment, image data having an earlier shooting date/time is laid out at the upper left position of the template, and image data having a later shooting date/time is laid out at the lower right position. In 10q, since the image data 1005 for the main slot has the latest shooting date/time, the templates of 10m to 10p are candidates. Furthermore, since the older image data 1006 for the sub-slot is a portrait image and the newer image data 1007 is a landscape image, the template of 10n is decided as a template optimum for the three selected image data, thereby deciding the layout. In step S418, a specific slot of a specific template is decided to lay out a specific image.

In step S419, the image correction module 214 executes image correction. If image correction ON is input from the image correction condition input module 213, the image correction module 214 executes image correction. As image correction, for example, dodging correction (luminance correction), red-eye correction, and contrast correction are executed. If image correction OFF is input from the image correction condition input module 213, the image correction module 214 executes no image correction. Image correction is executable for image data whose size has been converted into a size of 1,200 pixels on a short side in the sRGB color space.

In step S420, the layout information output module 215 creates layout information. The image layout module 212 lays out the image data having undergone image correction in step S419 in the respective slots of the template decided in step S418. At this time, the image layout module 212 resizes, in accordance with the size information of each slot, the image data to be laid out, and lays it out. The layout information output module 215 generates bitmap data by laying out the image data in the template.

In step S421, it is determined whether the processes in steps S417 to S420 have ended for all the double page spreads. If it is determined that the processes have not ended, the process is repeated from step S417; otherwise, the automatic layout processing of FIGS. 4A and 4B ends.

Figure 11:
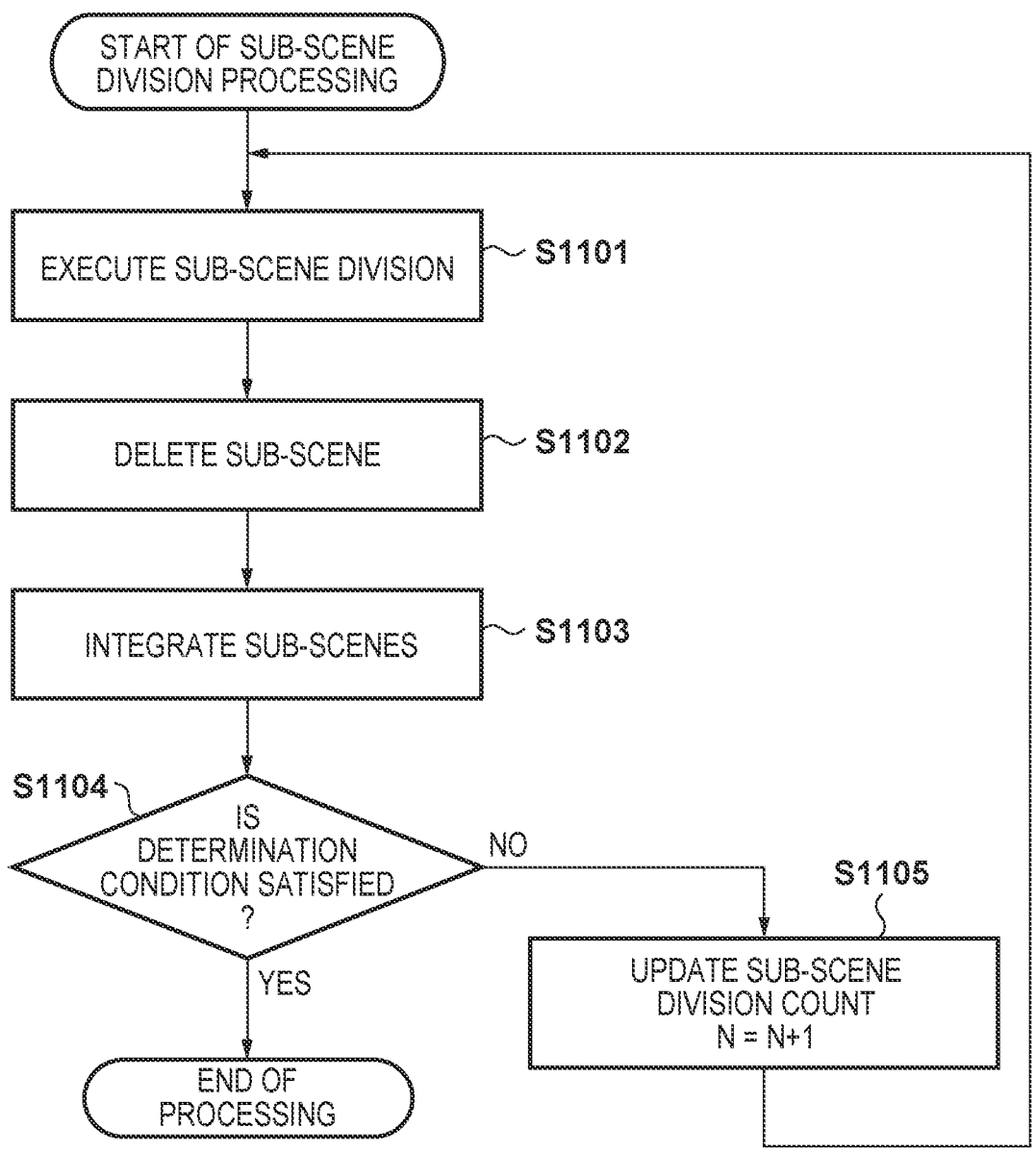
FIG. 11 is a flowchart illustrating sub-scene division processing.

Sub-scene division in step S414 of FIG. 4B will be described in detail below. FIG. 11 is a flowchart illustrating sub-scene division processing associated with the double page spread assignment module 209 of the album creation application according to this embodiment. The sub-scene division processing will be described with reference to FIG. 11.

In step S1101, the double page spread assignment module 209 executes sub-scene division. The same procedure as the sub-scene division procedure described in step S414 of FIG. 4B is used as a sub-scene division method and a description thereof will be omitted. FIG. 12A is a table showing an example of N=14 where N represents a sub-scene division count. A scene ID represents an ID (corresponding to one of numbers of 1 to 14 in this example) unique to each divided sub-scene.

Scene information shown in FIG. 12A is formed by including an image count, person count, degree of importance, period, and time difference in each sub-scene. The image count represents the number of images included in each divided sub-scene. The person count represents the total number of people in images included in each scene. In this example, the number of people corresponds to, for example, the number of faces detected by the image analysis module 204. The degree of importance represents the sum of the degrees of importance of the respective image data included in the scene based on weighting corresponding to a designated person. In this embodiment, in the main character setting processing in step S409 of FIG. 4A, the sum of the degrees of importance of the respective image data is calculated by setting "5" for image data including a person as a main character and "1" for an image including a person other than the main character regardless of automatic or manual setting. That is, as the number of image data including the main character is larger, a scene including these image data can be determined as a more important scene. Note that the degree of importance need only define the degree for determining the importance of each scene, and the present invention is not limited to the main character. For example, the degree of importance may be calculated based on the person count derived from the face count. The sum of the degrees of importance of the respective image data is calculated by setting "5" for image data whose person count is one or more and "1" for image data whose person count is 0. That is, as the number of image data including many faces is larger, a scene including these image data can be determined as a more important scene. Furthermore, if the image data include images extracted from moving image data, the number of image data increases, the degree of importance of the corresponding scene may rise. To cope with this, an identifier indicating whether image data is moving image data is acquired, the number of images extracted from a moving image may be thinned out from the degree of importance of the corresponding scene. For example, the sum of the degrees of importance of the respective image data is calculated by setting "0.1" for image data extracted from a moving image and "1" for image data other than that extracted from a moving image. That is, it is possible to prevent a scene including a large number of image data extracted from a moving image from being erroneously determined as an importance scene. The period indicates the shooting period of the images included in each divided sub-scene, and represents the time difference between the first image data and the last image data when the image data are sorted in the shooting time order. The time difference indicates the time difference between the respective divided sub-scenes, and represents a shooting interval between the end of the target scene and the beginning of the next scene when the image data are sorted in the shooting time order. "Deletion target" and "scene integration ID" of FIG. 12A will be described later.

In step S1102, the double page spread assignment module 209 deletes a sub-scene. In this embodiment, a condition for excluding a sub-scene from assignment to a double page spread is that the "degree of importance" of the scene information is 0. For example, a scene ID "11" of FIG. 12A has the degree of importance of 0. Therefore, the scene ID "11" satisfies the above condition, and thus indicates a scene of a deletion target.

In step S1103, the double page spread assignment module 209 integrates (combines) sub-scenes. The double page spread assignment module 209 repeats integration of sub-scenes until the scene count becomes equal to the double page spread count. In this embodiment, the designated double page spread count is, for example, 10. The 13 sub-scenes except for the sub-scene of the scene ID "11" of the deletion target are integrated, as shown in FIG. 12A. The same procedure as the scene integration procedure described in step S415 of FIG. 4B is used as a sub-scene integration method and a description thereof will be omitted. Note that when selecting a scene as an integration destination, a scene having a small image count or a scene having a small time difference may be selected, and the present invention is not limited to this. For example, if the result of scene classification is the same scene, the scene may be integrated with a scene having a small image count. If the result of scene classification is a different scene, the scene may be integrated with a scene having a small time difference. The scene integration ID field of FIG. 12A indicates the result of scene integration of sub-scenes. In FIG. 12A, scene IDs "2" and "3" indicate sub scenes to be integrated as a scene integration ID "2". FIG. 12B is a table showing the processing result of steps S1102 and S1103. As shown in FIG. 12B, the scenes are integrated and the scene integration IDs of FIG. 12A are set as scene IDs of FIG. 12B. Note that the scene information is updated along with scene integration.

In step S1104, the double page spread assignment module 209 determines, for each sub-scene, whether the scene information satisfies the condition for determining an important scene. In this embodiment, the double page spread assignment module 209 uses the scene information to determine whether the corresponding scene is an important scene. For example, a daily life scene including a large number of images including a main character as a shooting target or a trip scene whose shooting period is long and whose shooting frequency is high is determined as an important scene. As a result, such scene is highly likely kept within a double page spread as a scene worth forming the double page spread. Conversely, a scene including a small number of main characters or people or a sudden scene whose shooting period is short and whose shooting frequency is low is determined as an unimportant scene, and is highly likely set as a deletion target. In this embodiment, for the scene information of each sub-scene, the condition that the image count is 10 or more, the person count is 10 or more, the degree of importance is 20 or more, the period is 1.5 hours or more, and the time difference is 12 hours or more is predetermined as the condition for determining an important scene. In the example shown in FIG. 12B, all of the 10 sub-scenes satisfy this condition. Therefore, in step S1104, the double page spread assignment module 209 determines for each sub-scene that the scene information satisfies the condition for determining an important scene, thereby ending the processing shown in FIG. 11.

If it is determined in step S1104 for each sub-scene that the scene information does not satisfy the condition for determining an important scene, the process advances to step S1105. In step S1105, the double page spread assignment module 209 sets a division count of N=N+1 where N represents the sub-scene division count. That is, in step S1105, the double page spread assignment module 209 changes the division count, re-executes the processes in steps S1101 to S1103, and performs determination in step S1104 again. Note that since a change in the division count may unlimitedly repeat division and integration and may not be able to end division and integration, an upper limit is set for the division count. It is determined whether the upper limit of the division count has been reached. If it is determined that the upper limit has been reached, the processing shown in FIG. 11 ends without resetting the division count.

As described above, when the sub-scene division processing ends, the pieces of scene information for all the sub-scenes satisfy the condition for determining an important scene. That is, when the sub-scene division processing ends, all the sub-scenes can be determined as important scenes. Furthermore, as described above, the scene division count is equal to the designated double page spread count, and thus each double page spread is associated with each sub-scene in step S416 of FIG. 4B. Therefore, the scene determined as an important scene is highly likely kept within a double page spread as a scene worth forming the double page spread, thereby preventing a loss of an important scene.

Second Embodiment

The first embodiment has been described by assuming that the scene information is formed by including an image count, person count, degree of importance, period, and time difference in each sub-scene, and the scene information is used in the determination processing in step S1104. However, in step S1104, a content of image data may be used as a condition to perform determination. For example, if it is possible to acquire position information such as GPS information from image data of a shot scene, the position information is held as scene information. In step S1104, it is determined whether the position information of the shot scene is near position information representing a predetermined place such as a sightseeing spot, or whether the position information of the shot scene matches position information representing a user's favorite place. If it is determined that the position information of the shot scene is near position information representing a predetermined place or it is determined that the position information of the shot scene matches position information representing a user's favorite place, a double page spread assignment module 209 determines the scene as an important scene.

If it is possible to acquire shooting information from image data, the shooting information is held as scene information. The shooting information is, for example, information such as a screen shot or a shot image for a note. If it is considered that a type such as a screen shot or a shot image for a note is not suitable for image data to be laid out on a double page spread, when the ratio of the number of image data of such type to the number of image data of each scene is equal to or higher than a predetermined threshold, the scene is determined as an unimportant scene. For example, in step S1104, the double page spread assignment module 209 may set 0 as the "degree of importance" of a scene in which the percentage of the image data which are not double page spread layout targets is 100% so as to determine the scene as a deletion target in step S1102.

In the above example, the position information or shooting information acquired from image data is used as a condition in the determination processing in step S1104. However, the present invention is not limited to this and any information which can be acquired from image data may be used as a condition in the determination processing in step S1104.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-157511, filed Aug. 7, 2015, and Japanese Patent Application No. 2015-255241, filed Dec. 25, 2015, which are hereby incorporated by reference herein in their entirety.

What is claimed is:

1. An information processing method for creating an album, the method comprising:
  dividing a plurality of images into a plurality of first image groups based on shooting times of the plurality of images;
  increasing, in a case where a number m, where m is a positive integer, of the plurality of first image groups is smaller than a number n, where n is a positive integer, of pages of the album, the number of the plurality of first image groups based on the number of pages of the album;
  decreasing, in a case where the number m of the plurality of first image groups is larger than the number n of pages of the album, the number of the plurality of first image groups based on the number of pages of the album;
  selecting at least one image from each of a plurality of image groups obtained by the increasing or the decreasing, wherein each of the plurality of image groups is assigned to one of a plurality of templates of the number of pages of the album;
  laying out, for each of the plurality of templates, the at least one image selected in the selecting from an image group, of the plurality of image groups, that corresponds to the template; and
  displaying, on a display, the laid-out at least one image,
  wherein in a case where the number m of the plurality of first image groups is smaller than the number n of pages of the album, the increasing comprises a flow of processing including:
  (1) performing dividing processing that divides the plurality of images into a plurality of second image groups, a number N of the plurality of second image groups being larger than the number n of pages of the album;
  (2) performing deleting processing that deletes, in a case where at least one second image group of the plurality of second image groups has a degree of importance that is lower than a predetermined degree, the at least one second image group from the plurality of second image groups,
  (3) performing, after deleting processing, combining processing that combines groups with each other in the plurality of second image groups so that the number of the plurality of second image groups becomes the number n, and
  (4) performing determining processing that determines whether each of the plurality of second image groups that have undergone the combining processing satisfies a predetermined condition regarding a degree of importance,
  wherein, in a case where at least one of the plurality of second image groups that have undergone the combining processing does not satisfy the predetermined condition, the number N of the plurality of second image groups is set as N+1, and then the flow of processing (1) to (4) are performed again, and
  wherein, in a case where the plurality of second image groups that have undergone the combining processing satisfies the predetermined condition, the selecting of at least one image from each of the plurality of image groups obtained by the increasing or the decreasing is performed.

2. The method according to claim 1, wherein in the increasing, at least one image included in at least one of the plurality of first image groups is decided as a new image group.

3. The method according to claim 2, wherein in the increasing, a shooting period in at least one of the plurality of first image groups is specified based on time information of the image included in each of the plurality of first image groups, and an image group to undergo the dividing is selected from the plurality of first image groups based on the specified shooting period.

4. The method according to claim 1, wherein in the decreasing, at least one image included in at least one of the plurality of first image groups is decided as an image included in another image group of the plurality of first image groups.

5. The method according to claim 4, wherein in the decreasing, in two of the plurality of first image groups, a difference between times indicated by the pieces of time information is specified, and the other image group is selected based on the specified difference.

6. The method according to claim 1, wherein the number of pages of the album is based on a number designated by a user.

7. The method according to claim 1, further comprising:
  classifying, into one of a plurality of kinds of scenes, each of a plurality of image groups obtained by the increasing or the decreasing,
  wherein at least one image is selected in each of the plurality of image groups based on a criterion corresponding to the kind of scene into which each of the image groups has been classified in the classifying.

8. The method according to claim 1, further comprising:
  deciding, based on information about a shooting target in at least one image included in one of the plurality of second image groups, the degree of importance of the image group including the image.

9. The method according to claim 8, further comprising:
  setting a shooting target as a main character,
  wherein in the deciding, the higher degree of importance is decided for an image group including a larger number of images including the main character set in the setting.

10. The method according to claim 1, wherein the predetermined condition is that the degree of importance of each of the plurality of second image groups that have undergone the combining processing is higher than a second predetermined degree, and
  wherein the second predetermined degree is higher than the predetermined degree.

11. The method according to claim 1, wherein the degree of importance is determined based on at least one of persons included in images of the plurality of second image groups, a shooting period of the plurality of second image groups, and time difference of shooting time between two image groups in the plurality of second image groups.

12. The method according to claim 7, wherein, in the classifying, one of the plurality of kinds of scenes is determined individually on each of the plurality of second image groups.

13. The method according to claim 7, wherein the at least one image is assigned to a template in accordance with an order of shooting date of the plurality of second image groups.

14. The method according to claim 1, wherein the number of pages is a number of double page spread of the album.

15. The method according to claim 1, further comprising:
determining, based on at least one image included in one of the plurality of image groups, whether to lay out the image group,
wherein in the laying out, no image included in an image group, among the plurality of image groups, which has been determined in the determining not to be laid out is laid out.

16. An information processing apparatus for creating an album, the apparatus comprising:
a division unit configured to divide a plurality of images into a plurality of first image groups based on shooting times of the plurality of images;
a control unit configured to (a) increase, in a case where a number m, where m is a positive integer, of the plurality of first image groups is smaller than a number n, where n is a positive integer, of pages of the album, the number of the plurality of first image groups based on the number of pages of the album, (b) decrease, in a case where the number m of the plurality of first image groups is larger than the number n of pages of the album, the number of the plurality of first image groups based on the number of pages of the album, (c) select at least one image from each of a plurality of image groups obtained by the increasing or the decreasing, wherein each of the plurality of image groups is assigned to one of a plurality of templates of the number of pages of the album, (d) lay out, for each of the plurality of templates, the at least one image selected in the selecting from an image group, of the plurality of image groups, that corresponds to the template, and (e) display, on a display, the laid-out at least one image,
wherein in a case where the number m of the plurality of first image groups is smaller than the number n of pages of the album, the increasing comprises a flow of processing including:
(1) performing dividing processing that divides the plurality of images into a plurality of second image groups, a number N of the plurality of second image groups being larger than the number n of pages of the album; and
(2) performing deleting processing that deletes, in a case where at least one second image group of the plurality of second image groups has a degree of importance that is lower than a predetermined degree, the at least one second image group from the plurality of second image groups,
(3) performing, after deleting processing, combining processing that combines groups with each other in the plurality of second image groups so that the number of the plurality of second image groups becomes the number n, and
(4) performing determining processing that determines whether each of the plurality of second image groups that have undergone the combining processing satisfies a predetermined condition regarding a degree of importance,
wherein, in a case where at least one of the plurality of second image groups that have undergone the combining processing does not satisfy the predetermined condition, the number N of the plurality of second image groups is set as N+1, and then the flow of processing (1) to (4) are performed again, and
wherein, in a case where the plurality of second image groups that have undergone the combining processing satisfies the predetermined condition, the selecting of at least one image from each of the plurality of image groups obtained by the increasing or the decreasing is performed.

17. A non-transitory computer-readable storage medium storing a program for causing a computer to function, for creating an album, so as to:
divide a plurality of images into a plurality of first image groups based on shooting times of the plurality of images;
increase, in a case where a number m, where m is a positive integer, of the plurality of first image groups is smaller than a number n, where n is a positive integer, of pages of the album, the number of the plurality of first image groups based on the number of pages of the album;
decrease, in a case where the number m of the plurality of first image groups is larger than the number n of pages of the album, the number of the plurality of first image groups based on the number of pages of the album;
select at least one image from each of a plurality of image groups obtained by the increasing or the decreasing, wherein each of the plurality of image groups is assigned to one of a plurality of templates of the number of pages of the album;
lay out, for each of the plurality of templates, the at least one image selected in the selecting from an image group, of the plurality of image groups, that corresponds to the template; and
display, on a display, the laid-out at least one image,
wherein in a case where the number m of the plurality of first image groups is smaller than the number n of pages of the album, the increasing comprises a flow of processing including:
(1) performing dividing processing that divides the plurality of images into a plurality of second image groups, a number N of the plurality of second image groups being larger than the number n of pages of the album;
(2) performing deleting processing that deletes, in a case where at least one second image group of the plurality of second image groups has a degree of importance that is lower than a predetermined degree, the at least one second image group from the plurality of second image groups,
(3) performing, after deleting processing, combining processing that combines groups with each other in the plurality of second image groups so that the number of the plurality of second image groups becomes the number n, and
(4) performing determining processing that determines whether each of the plurality of second image groups that have undergone the combining processing satisfies a predetermined condition regarding a degree of importance,
wherein, in a case where at least one of the plurality of second image groups that have undergone the combining processing does not satisfy the predetermined condition, the number N of the plurality of second image groups is set as N+1, and then the flow of processing (1) to (4) are performed again, and wherein, in a case where the plurality of second image groups that have undergone the combining processing satisfies the predetermined condition, the selecting of at least one image from each of the plurality of image groups obtained by the increasing or the decreasing is performed.

* * * * *